*N. Lawrence,*

*Caster.*

*No. 106,840.* *Patented Aug. 30, 1870.*

Witnesses.

N. Lawrence Inventor
by
his Attorneys.

United States Patent Office.

NATHAN LAWRENCE, OF TAUNTON, MASSACHUSETTS.

Letters Patent No. 106,840, dated August 30, 1870.

IMPROVED CALL-BELL AND VESSEL.

The Schedule referred to in these Letters Patent and making part of the same

To all whom it may concern:

Be it known that I, NATHAN LAWRENCE, of Taunton, in the county of Bristol and State of Massachusetts, have invented a new and improved Combined Call-Bell and Vessel; and I do hereby declare the following to be a full, clear, and exact description of the same, reference being had to the accompanying drawing making a part of this specification, in which—

Figure 2:
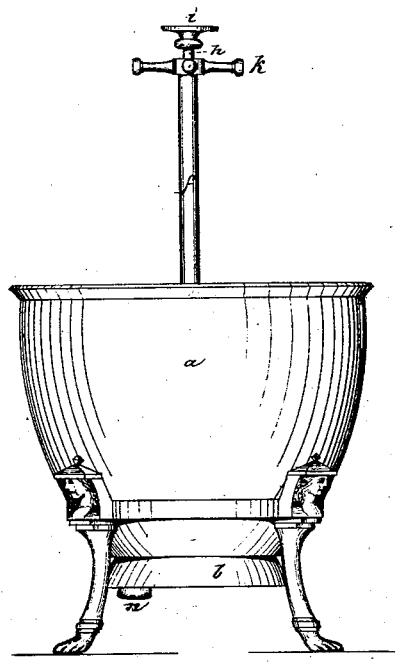
Figure 1:
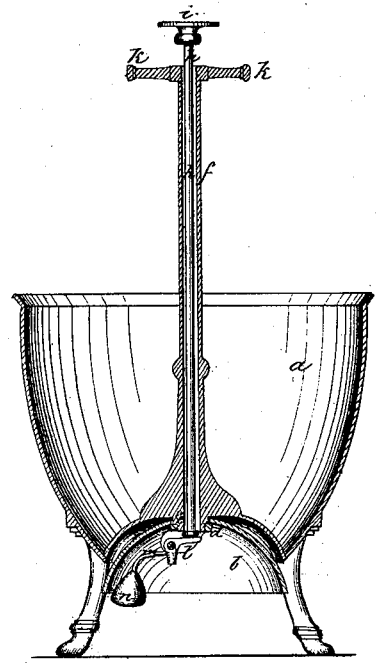

Figure 1 is a sectional elevation, and
Figure 2 is a side elevation.

This invention relates to a vessel that may be used as a slop-bowl or sugar-bowl, from the bottom of which a tube projects upward within the vessel, a stem being placed within said tube, extending above its top, passing through the bottom of the vessel, and furnished with a finger-piece at its upper end, outside the tube, the sounder of a call-bell being attached to the bottom of the vessel, while its tongue is hung between lugs that extend downward from the top of the sounder, in a position where it may be forced against the inside of the sounder by thrusting the said stem downward.

In the drawing—

$a$ is the vessel, in the under side of which is a concavity, into which fits the sounder $b$ of a call-bell, said sounder being kept in place by a nut, $d$, that is screwed upon the outside of a threaded tube, $e$, that extends downward from the bottom of the vessel through an orifice in the top of the sounder.

$f$ is the tube that extends upward from the bottom inside the vessel.

$h$ is the stem that is placed within the tube $f$, and extends downward through the tube $e$.

$i$ is a finger-disk on the top of the stem $h$.

$k$ are arms projecting radially in a horizontal direction from the top of the tube $f$, which arms afford convenient bearings for the fingers in carrying the vessel about.

$l\ l$ are lugs, projecting downward from the nut $d$.

$m$ is an elbow, hung between the lugs $l$, with one of its arms just below the bottom of the stem $h$.

$n$ is the tongue of the bell, attached to the other arm of the elbow $m$.

On pushing the stem $h$ downward it strikes the elbow $m$ and drives the tongue $n$ outward against the sounder.

Having thus described my invention,

What I claim as new, and desire to secure by Letters Patent, is—

The combination of vessel $a$, tube $f$, stem $h$, and sounder $b$, as specified.

Witnesses:         NATHAN LAWRENCE.
F. L. FISH,
WILLIAM W. SWAN.